(12) United States Patent
Wix

(10) Patent No.: US 8,158,173 B2
(45) Date of Patent: Apr. 17, 2012

(54) COMPOSITION FOR COATING, PROCESS FOR COATING AND FROZEN COATED CONFECTION

(75) Inventor: Loyd Wix, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 610 days.

(21) Appl. No.: 12/220,970

(22) Filed: Jul. 30, 2008

(65) Prior Publication Data

US 2009/0035420 A1  Feb. 5, 2009

(30) Foreign Application Priority Data

Jul. 31, 2007 (EP) ..................... 07113487
Jul. 31, 2007 (EP) ..................... 07113488

(51) Int. Cl.
*A23G 3/20* (2006.01)
(52) U.S. Cl. .......... 426/100; 426/302
(58) Field of Classification Search ........... 426/100, 426/302
See application file for complete search history.

(56) References Cited

U.S. PATENT DOCUMENTS

| | | |
|---|---|---|
| 3,582,357 A | 6/1971 | Katz |
| 5,077,076 A | 12/1991 | Gonsalves et al. |
| 5,246,725 A | 9/1993 | Fisher et al. |
| 5,384,146 A | 1/1995 | Gonsalves et al. |
| 5,486,373 A | 1/1996 | Holt et al. |
| 6,096,867 A | 8/2000 | Byass et al. |
| 2003/0035877 A1 | 2/2003 | Best et al. |
| 2006/0141103 A1 | 6/2006 | Heritage et al. |

FOREIGN PATENT DOCUMENTS

| | | |
|---|---|---|
| EP | 1673980 | 6/2006 |
| WO | WO 93/21778 | 11/1993 |
| WO | WO 93/21779 | 11/1993 |
| WO | WO 01/30175 A | 5/2001 |
| WO | WO 02/41702 | 5/2002 |
| WO | WO 02/089596 A | 11/2002 |

OTHER PUBLICATIONS

Smith, Karen E. "Effects on Freezing Point of Carbohydrates Commonly used in Frozen Desserts". 1983 (no month). Journel of Dairy Science, vol. 66, No. 12, pp. 2464-2467.*
"Calculating Molecular Weights" from the Polymer Science Learning Center, Dept. of Polymer Science, The University of Mississippi, Copyright 2005, pp. 1-4.*
FDA Select Committee on GRAS Substances Opinion: Corn Syrup. Retrieved from www.fda.gov on Aug. 31, 2011. pp. 1-2.*
European Search Report Application No. EP 08160209completed Feb. 19, 2009.
European Search Report Application No. EP 07113488 dated Dec. 17, 2007.
Co-pending application Eddies et al., U.S. Appl. No. 12/220,979, filed Jul. 30, 2008.

* cited by examiner

*Primary Examiner* — Lawrence Tarazano
*Assistant Examiner* — Jenna A Watts
(74) *Attorney, Agent, or Firm* — Michael P. Aronson

(57) ABSTRACT

Frozen confection comprising a core and a coating is provided, wherein the coating comprises 17 to 50% (w/w) of saccharides and polysaccharides; 0.017 to 12.5% (w/w) of sweeteners selected from the group consisting of fructose, sucrose, dextrose, artificial sweeteners and any mixture thereof; and 50 to 83% water; wherein the average molecular weight of the saccharides and polysaccharides is between 476 and 9000.

6 Claims, No Drawings

COMPOSITION FOR COATING, PROCESS FOR COATING AND FROZEN COATED CONFECTION

TECHNICAL FIELD OF THE INVENTION

The present invention relates to a composition for coating a frozen confection, to a process for coating a frozen confection and to the frozen confection obtained.

BACKGROUND TO THE INVENTION

Individual ice cream products are very often held on a stick. Sometimes the ice cream is in a wafer, generally a cone, rarely it is in an individual packaging and is consumed with a spoon. One of the reasons for this is that if the ice cream product is directly touched by fingers, it sticks.

It has been proposed to use chocolate or fat coatings on ice cream. This provides the required dry to touch feeling (i.e. not leaving residues on the skin) but on the other hand requires the use of fat. This does not fit with the health concerns of modern consumers.

There is therefore a need for a coating which provides a dry to touch feeling without having to use fat.

Water ice coating is already known for this purpose but presents a major taste problem since, actually, it has no taste at all and adding fructose or sucrose will lower the freezing point of the coating, rendering it gooey and sticky. If instead of this, artificial sweeteners are added (which will not impact on the freezing point of the coating and thus not present the drawbacks of sucrose or fructose) it has now been found that the coating is still very brittle, has no flexibility at all and will provide a very hard, brittle mouthfeel to consumers, something to avoid. Moreover, the very unflexible, rigid behaviour exhibited by a water ice coating leads to very fragile coatings which break and peel off very easily under the slightest deformation, again something to avoid.

In fact, whether there are artificial sweeteners or not in the water ice coating, the product looks shiny, showing a transparent film, wrongly suggesting that the product has been contaminated with water which then froze on its surface. Obviously, it is not something acceptable from a consumer standpoint.

There is therefore a need for a coating which:
tastes good,
is dry to touch
is not brittle
has a low energy content compared to a typical chocolate couveture that contains 5.52 kcal/gm.
is fat free whereas a typical chocolate couveture contains 32% (wt %) saturated fat.

It has now been found that some polysaccharide compositions give rise to coatings which are less sticky and less prone to sinter than sucrose and fructose ones while providing the required taste and flexibility.

Tests and Definitions

Saccharides and Polysaccharides

The term "saccharides" refers to mono- and di-saccharides, and "polysaccharides" means polymers consisting of three or more saccharide units. Thus "saccharides" includes fructose, dextrose and sucrose.

The polysaccharides used in the present invention are preferably corn syrups with a dextrose equivalent (DE) of greater than 2 preferably >3 and more preferably >4. Corn syrups are complex multi-component sugar mixtures and the dextrose equivalent is a common industrial means of classification. Since they are complex mixtures their number average molecular weight $<M>_n$ can be calculated from the equation below. (Journal of Food Engineering, 33 (1997)

$$DE = \frac{18016}{<M>_n}$$

Other polysaccharides, such as polydextrose and/or fructo-oligosaccharides may be used. Fructo-oligosaccharides are composed of linear chains of fructose units linked by β(2-1) bonds and often terminated by a glucose unit. Fructo-oligosaccharides include inulin, oligofructose (also sometimes called oligofructan) and kestose.

Sweeteners

The term "sweeteners" refers exclusively to sucrose, fructose, dextrose and artificial sweeteners (i.e. Sucralose [1,6-Dichloro-1,6-dideoxy-β-D-fructofuranosyl-4-chloro-4-deoxy-α-D galactopyranoside], Aspartame [aspartyl phenylalanine methyl ester], Sodium saccharin, alitame, thaumatin, cyclamate, glycyrrhizin, stevioside, neohesperidine, sucralose, monellin, Acesulfame K or salts thereof and Neotame [N—[N-(3,3-dimethylbutyl)-L-alpha-aspartyl]-L-phenylalanine 1 methyl ester]. Thus sucrose, dextrose and fructose are both sweeteners and saccharides.

Preferably the sweeteners are sucrose and/or fructose.

Average Molecular Weight

For the purposes of this patent, the average molecular weight for a mixture of saccharides and polysaccharides is defined by the number average molecular weight $<M>_n$ calculated by the following equation:

$$<M>_n = \frac{\sum w_i}{\sum (w_i/M_i)} = \frac{\sum N_i M_i}{\sum N_i}$$

Where $w_i$ is the mass of species i, $M_i$ is the molar mass of species i and $N_i$ is the number of moles of species i of molar mass $M_i$.

Relative Sweetness

Sweetness is relative to sucrose. As sucrose is the typical sweetener material used in food it is arbitrarily assigned a relative sweetness value of 1, with all sweetness intensities of other sugars/sweetener systems compared with this. Therefore a product with a Relative Sweetness of 0.1 would have the sweetness equivalent to a 10% solution of sucrose. A product with a Relative Sweetness of 0.25 would have the sweetness equivalent to a 25% sucrose solution.

GENERAL DESCRIPTION OF THE INVENTION

It is a first object of the present invention to provide a composition for coating a frozen confectionery product, and comprising:
17 to 50% (w/w) of saccharides and polysaccharides
0.017 to 12.5% (w/w) of sweeteners selected from the group consisting of fructose, sucrose, dextrose, artificial sweeteners and any mixture thereof,
50 to 83% water
wherein the average molecular weight of the saccharides and polysaccharides is between 476 and 9000.

This allows for the provision of a coating which when applied onto a frozen product will be sufficiently flexible, and have a good taste whilst being dry to touch.

Preferably also, the composition comprises:
25 to 45% (w/w) of saccharides and polysaccharides 0.017 to 10% (w/w) of sweeteners selected from the group consisting of fructose, sucrose, dextrose, artificial sweeteners and any mixture thereof, 55 to 75% water wherein the average molecular weight of the saccharides and polysaccharides is between 590 and 6500.

Preferably, the composition for a coating frozen confectionery product is not a gel (i.e. a composition in which the polysaccharides form cross-links so that it has an elastic nature). This allows for easy handling, the composition being pumpable and sprayable.

Preferably also the sweeteners have a relative sweetness of 0.1 to 0.25.

It is a second object of the present invention to provide a process for coating a frozen confectionery product wherein a frozen confectionery product is coated by a composition comprising 17 to 50% (w/w) of saccharides and polysaccharides 0.017 to 12.5% (w/w) of sweeteners selected from the group consisting of fructose, sucrose, dextrose, artificial sweeteners and any mixture thereof, 50 to 83% water wherein the average molecular weight of the saccharides and polysaccharides is between 476 and 9000.

In one preferred embodiment the frozen confectionery product is dipped into a bath of a coating composition comprising:

25 to 45% (w/w) of saccharides and polysaccharides 0.017 to 10% (w/w) of sweeteners selected from the group consisting of fructose, sucrose, dextrose, artificial sweeteners and any mixture thereof, 55 to 75% water wherein the average molecular weight of the saccharides and polysaccharides is between 590 and 6500.

In another preferred embodiment, a composition is sprayed onto the frozen confectionery product, the composition for coating frozen confectionery product comprising:

25 to 45% (w/w) of saccharides and polysaccharides 0.017 to 10% (w/w) of sweeteners selected from the group consisting of fructose, sucrose, dextrose, artificial sweeteners and any mixture thereof, 55 to 75% water wherein the average molecular weight of the saccharides and polysaccharides is between 590 and 6500.

It is a third object of the present invention to provide a frozen confection comprising a core material and a coating wherein the coating comprises 17 to 50% (w/w) of saccharides and polysaccharides 0.017 to 12.5% (w/w) of sweeteners selected from the group consisting of fructose, sucrose, dextrose, artificial sweeteners and any mixture thereof, 50 to 83% water wherein the average molecular weight of the saccharides and polysaccharides is between 476 and 9000.

Preferably, the coating comprises 25 to 45% (w/w) of saccharides and polysaccharides 0.017 to 10% (w/w) of sweeteners selected from the group consisting of fructose, sucrose, dextrose, artificial sweeteners and any mixture thereof, 55 to 75% water wherein the average molecular weight of the saccharides and polysaccharides is between 590 and 6500.

Preferably the core material is a frozen aerated confection.

DETAILED DESCRIPTION OF THE INVENTION

The invention will be further described in the following examples.

Examples 1 and 2 (Comparative)

The following coating compositions were produced.

|  | Example 1 | Example 2 |
|---|---|---|
| Water | 77.4% | 76.77% |
| 9DE corn syrup | 11.8% |  |
| Fructose | 10.6% |  |
| Locust Bean Gum | 0.2% | 0.05% |
| Sucrose |  | 22.5% |
| Colour and Flavour |  | 0.23% |
| Citric acid |  | 0.45% |
| Average Molecular Weight | 342 | 340 |
| Ice content at −18° C. | 70% | 65% |

The coating compositions were then frozen at −18° C. The resulting frozen coatings were found to be sticky and left residue on the fingers.

Examples 3 to 5

The following coating compositions were produced.

|  | Example 3 | Example 4 | Example 5 |
|---|---|---|---|
| Water | 70.7% | 60.3% | 69.1% |
| 9DE corn syrup | 20.1% | 30.5% | 23.7% |
| Fructose | 9% | 9% | 7% |
| Locust Bean Gum | 0.2% | 0.2% | 0.2% |
| Average Molecular Weight | 485 | 590 | 605 |

The coating compositions were then frozen at −18° C. The resulting frozen coatings were found not to be sticky and left no residues on fingers.

Examples 6 and 7

The following coating compositions were produced.

|  | Example 6 | Example 7 |
|---|---|---|
| Locust Bean Gum | 0.2% | 0.05% |
| Citric acid | 0.45% | 0.45% |
| Colour & Flavour | 0.23% | 0.23% |
| Water | 52.62% | 66.24% |
| 10DE Maltodextrin | 22% | 33% |
| Apricot puree | 20% |  |
| Fructose | 4% |  |
| Splenda X600S |  | 0.03% |
| Malic acid | 0.5% |  |
| Average Molecular Weight | 647 | 1800 |

The coating compositions were then frozen at −18° C. The resulting frozen coatings were found not to be sticky and left no residues on fingers.

The invention claimed is:

1. A process for coating a frozen confectionery product wherein a frozen confectionery product is coated by a composition comprising
- 25 to 45% (w/w) of saccharides and polysaccharides comprising a mixture of fructose and/or sucrose with a corn syrup having a dextrose equivalent (DE) greater than 4,
- 0.017 to 10% (w/w) of sweeteners selected from the group consisting of fructose, sucrose, dextrose, artificial sweeteners and mixtures thereof,
- 55 to 75% water wherein the number average molecular weight of saccharides and polysaccharides is between 590 and 6500; and wherein the composition is not a gel.

2. Process according to claim 1 wherein the frozen confectionery product is dipped into a bath of a coating composition comprising:
- 25 to 45% (w/w) of saccharides and polysaccharides saccharides and polysaccharides comprising a mixture of fructose and/or sucrose with a corn syrup having a dextrose equivalent (DE) greater than 4,
- 0.017 to 10% (w/w) of sweeteners selected from the group consisting of fructose, sucrose, dextrose, artificial sweeteners and mixtures thereof,
- 55 to 75% water wherein the number average molecular weight of the saccharides and polysaccharides is between 590 and 6500; and wherein the composition is not a gel.

3. Process according to claim 1 wherein a composition is sprayed onto the frozen confectionery product, the composition comprising:
- 25 to 45% (w/w) of saccharides and polysaccharides comprising a mixture of fructose and/or sucrose with a corn syrup having a dextrose equivalent (DE) greater than 4,
- 0.017 to 10% (w/w) of sweeteners selected from the group consisting of fructose, sucrose, dextrose, artificial sweeteners and mixtures thereof,
- 55 to 75% water wherein the number average molecular weight of the saccharides and polysaccharides is between 590 and 6500; and wherein the composition is not a gel.

4. A frozen confection comprising a core and a coating wherein the coating comprises
- 25 to 45% (w/w) of saccharides and polysaccharides comprising a mixture of fructose and/or sucrose with a corn syrup having a dextrose equivalent (DE) greater than 4,
- 0.017 to 10% (w/w) of sweeteners selected from the group consisting of fructose, sucrose, dextrose, artificial sweeteners and mixtures thereof,
- 55 to 75% water wherein the number average molecular weight of the mixture of saccharides and polysaccharides is between 590 and 6500; wherein the coating does not contain fat; and wherein the coating is not a gel;

wherein the frozen confection does not have a coating that includes fat.

5. A frozen confection according to claim 4, wherein the core material is a frozen aerated confection.

6. The process according to claim 1 wherein the saccharides and polysaccharides comprise a mixture of fructose and a corn syrup having a dextrose equivalent (DE) greater than 4 and wherein the level of fructose is 4% to 9% based on the total weight of the coating.

* * * * *